July 22, 1969  C. H. ALEXANDER  3,456,364
STUDENT-TEACH-EACH-OTHER DEVICE
Filed Dec. 13, 1966  2 Sheets-Sheet 1

COLIN HUGH ALEXANDER
INVENTOR.

BY James D. Givnan
ATT'Y

July 22, 1969   C. H. ALEXANDER   3,456,364
STUDENT-TEACH-EACH-OTHER DEVICE
Filed Dec. 13, 1966   2 Sheets-Sheet 2

| ÷ | 10 | 12 | 14 | 15 | 16 | 18 | 20 | 21 | 22 |
|---|----|----|----|----|----|----|----|----|----|
| 1 | O | O | O | O | O | O | O | O | O |
| 2 | O | O | O | O | O | O | O | ⁵O⁴ | O |
| 3 | ⁴O⁵ | O | O | O | O | O | O | O | O |
| 4 | O | O | O | O⁵ | O | O | O | O | O |
| 5 | O | O | O | O | O | ⁴O⁵ | O | O | O |
| 6 | O | O | ⁴O⁵ | O | O | O | O | O | O |
| 7 | ⁴O⁵ | O | O | O | O | O | O | O | O |
| 8 | O | O | O | O | ⁴O⁵ | O | O | O | O |
| 9 | O | O | O | O | O | O | O | O | ⁴O⁵ |

Fig. 5

| 22 | 21 | 20 | 18 | 16 | 15 | 14 | 12 | 10 | ÷ |
|----|----|----|----|----|----|----|----|----|---|
| 22 O | 21 O | 20 O | 18 O | 16 O | ⁴₅15 O | 14 O | 12 O | 10 O | 1 |
| 11 O | 10R1 O | 10 O | 9 O | 8 O | 7R1 O | 7 O | ⁴6 O₅ | 5 O | 2 |
| 7R1 O | 7 O | 6R2 O | 6 O | 5R1 O | 5 O | 4R2 O | 4 O | 3R1 O | 3 |
| 5R2 O | 5R1 O | 5 O | 4R2 O | 4 O | 3R3 O | 3R2 O | 3 O | 2R2 O | 4 |
| 4R2 O | 4R1 O | 4 O | 3R3 O | 3R1 O | 3 O | 2R4 O | 2R2 O | 2 O | 5 |
| 3R4 O | 3R3 O | 3R2 O | ⁴3 O⁵ | 2R4 O | 2R3 O | 2R2 O | 2 O | 1R4 O | 6 |
| 3R1 O | 3 O | 2R6 O | 2R4 O | 2R2 O | 2R1 O | 2 O | 1R5 O | 1R3 O | 7 |
| 2R6 O | 2R5 O | 2R4 O | 2R2 O | 2 O | 1R7 O | 1R6 O | 1R4 O | 1R2 O | 8 |
| 2R4 O | 2R3 O | 2R2 O | 2 O | 1R7 O | 1R6 O | 1R5 O | 1R3 O | 1R1 O | 9 |

Fig. 6

COLIN HUGH ALEXANDER
INVENTOR.

BY *James D. Givnan*
ATT'Y

United States Patent Office 3,456,364
Patented July 22, 1969

3,456,364
STUDENT-TEACH-EACH-OTHER DEVICE
Colin Hugh Alexander, 2070 High St. SE.,
Salem, Oreg. 97302
Filed Dec. 13, 1966, Ser. No. 601,474
Int. Cl. G09b 23/02, 19/02
U.S. Cl. 35—31                                    1 Claim

ABSTRACT OF THE DISCLOSURE

A teaching aid in the form of a student-teach-each-other device designed for use by two students working together in any one of the fundamental processes of addition, multiplication, subtraction and division. The invention comprises a card having a front face and a rear face for student and teacher use respectively, wherein both faces are delineated in matching vertical and horizontal sectional rows and wherein the sections on the rear surface of the card are inscribed with the relative values of the numbers of one series with those of the other at the intersection of their respective rows.

---

One of the principal objects of the present invention is to provide a device of the character described in the form of a card or matrix adapted to be held vertically in one hand by the student appointed or chosen to work on the hereinafter designated "teaching side" of the card in propounding questions to be answered by the student on the opposite or "learning side" of the card and whereby the accuracy of those answers are immediately checked by the student on the teaching side as the work progresses.

Another object of the invention resides in color-coding the vertical columns of both sides of the cards for convenience in diversifying study programs or in assigning various problems to different groups or to students in pairs as above pointed out. This feature is of equal importance in holding the student's interest and also to lessen their tendency to memorize the answers rather than learn them by following prescribed procedures.

The device is highly effective in improving the educational skills when used by a student with a student, as aforesaid, a classroom teacher with a student (as an immediate skill check) or by a parent and a child.

The foregoing and other objects and advantages which which will become subsequently apparent reside in the details of construction and operation as more fully hereinafter described and claimed, reference being had to the accompanying drawings forming a part hereof and in which:

Figure 1:
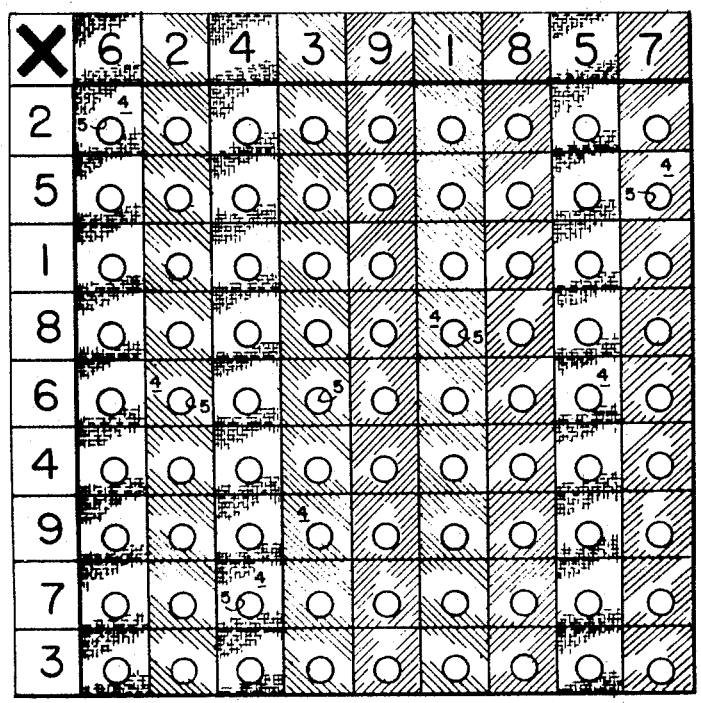
FIGURE 1 is an elevational view of a card made in accordance with my invention. The side of the card presented is for the study of multiplication tables as indicated by the symbol appearing in the upper left hand corner thereof.
Figure 2:
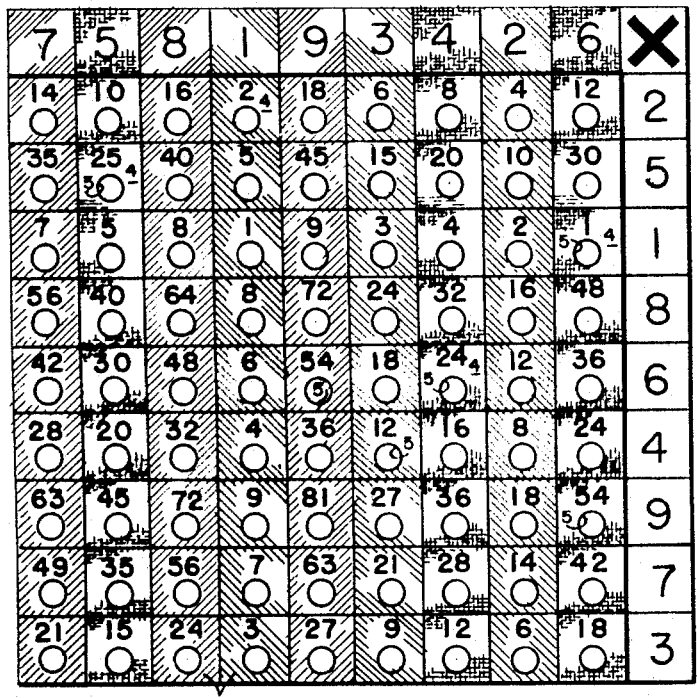
FIGURE 2 is a similar view of the reverse or opposite side of the card.
Figure 3:
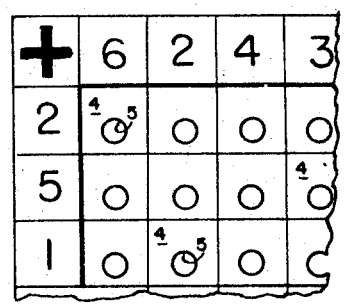
Figure 4:
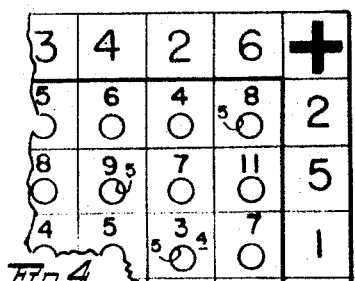

FIGURES 3 and 4 are fragmentary views respectively of both sides of a similar card containing problems of addition, and FIGURES 5 and 6 are views similar to FIGURES 1 and 2 showing both sides of a card for use in teaching problems of division.

Referring now more particularly to the drawings wherein like reference characters designate like parts, the typical card or matrix shown in the various views is preferably made of strong, durable, opaque sheet plastic or the like.

The side of the cards shown in FIGURES 1, 3 and 5 is the learning side and that in FIGURES 2, 4 and 6 the teaching side. Both sides of each card has inscribed or printed thereon a series of horizontal parallel lines and right angularly related vertical parallel lines whose intersections provide square blank sections each indicated at 4 and having an opening 5 therethrough, as shown.

The vertical rows or columns of the sections in FIGURE 1 are headed by the numbers of the multiplicand arranged in random order across the top of the card from the multiplication symbol at the top left hand corner thereof. The horizontal rows are identified by the numbers along the left hand vertical marginal row which show how many times the numbers of the multiplicand are to be taken or the number by which they are to be multiplied and hence called the multiplier.

The delineation is identical on both sides of the card but the arrangement of the numbers of the multiplicand and those of the multiplier are in reversed locations as shown.

By this arrangement, a student on the teaching side of the card (FIG. 2) in presenting the question "What is nine times six?" merely inserts a pencil or similar object through the opening 5 in the square intersection of the vertical (multiplicand) column 9 and the horizontal (multiplier) row 6.

When posing the question "What is six times nine?" the pencil is inserted in the intersection of the vertical column 6 and the horizontal row 9. The student on the learning side (FIG. 1) knowing the correct answer to both questions will respond orally with the correct number of the product whose numerical value (54) is shown only on the teaching side (FIG. 2) of the card in the proper intersections selected, as above pointed out.

By the foregoing process, a classroom teacher supervising this routine can immediately check the answers and thereby determine the student's knowledge of the multiplication tables. The same procedure is followed by two students utilizing the learning side and teaching side of the cards bearing problems of addition shown in FIGURES 3 and 4; those bearing problems of division shown in FIGURES 5 and 6; and those bearing problems of subtraction (not shown).

The learning and teaching sides of the card bearing the problems of division as shown respectively in FIGURES 5 and 6 are the same as those just described with the numbers of the dividend heading the vertical columns and the horizontal rows being indentified by the numbers of the divisors.

The squares at the intersections of these rows are blank on the learning side (FIG. 5) and provided on the teaching side (FIG. 6) with the quotient of any number in the divided row when divided by any number in the row of divisors. For example, the quotient of "20" divided by "5" is four; the quotient of "21" divided by "4" is five with a remainder of 1 (5R1) as shown. Here, as in the procedure with the other cards, a question by the student on the teaching side is posed by inserting a pencil through the opening in the square intersection of his selection, and the question is answered orally by the learning student on the opposite side.

Both sides of all the cards are color coded as shown, for example, in FIGURES 1 and 2, wherein the vertical columns identified by the numbers 6, 4 and 5 are lined for yellow, columns 2, 3 and 1 for green, and 9, 8 and 7 for brown. This coloring arrangement can, of course, be changed from time to time and serves a dual purpose of providing convenient means for the classroom teacher in assigning work to be done in various areas at different times and for increasing student interest.

The arrangement of the numbers across the top of the cards and those along the sides thereof may also be applied in various arrangements in order to avoid students memorizing the numbers and answers according to positions on the card rather than as a solution to given problems.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A teaching aid of the question and answer type comprising a card having a front face and a rear face for student and teacher use respectively and wherein both of said faces are delineated into sections by matching vertical and horizontal sectional rows, said vertical rows headed across the top of both sides of the card with a series of numbers of simple value, said horizontal rows identified by a series of numbers of simple value along one of said vertical rows, each of said sections of each row having an opening therethrough for the insertion of a marker to identify the selected relative value of the numbers of one series to those of the other, said sections on said rear face of the card inscribed with the relative values of the numbers of one series with those of the other at the intersection of their respective rows adjacent said openings, whereby determination of the relative values of the numbers in both of said series can be simultaneously expressed in the intersections of said sections of the vertical and horizontal rows on both sides of the card.

References Cited

UNITED STATES PATENTS

| | | |
|---|---|---|
| 898,587 | 9/1908 | Matthias. |
| 1,400,887 | 12/1921 | Liebman. |
| 3,002,295 | 10/1961 | Armstrong _____ 35—31.4 |
| 3,224,114 | 12/1965 | Swanson _____ 35—70 XR |

LAWRENCE CHARLES, Primary Examiner